Figures 1, 2:
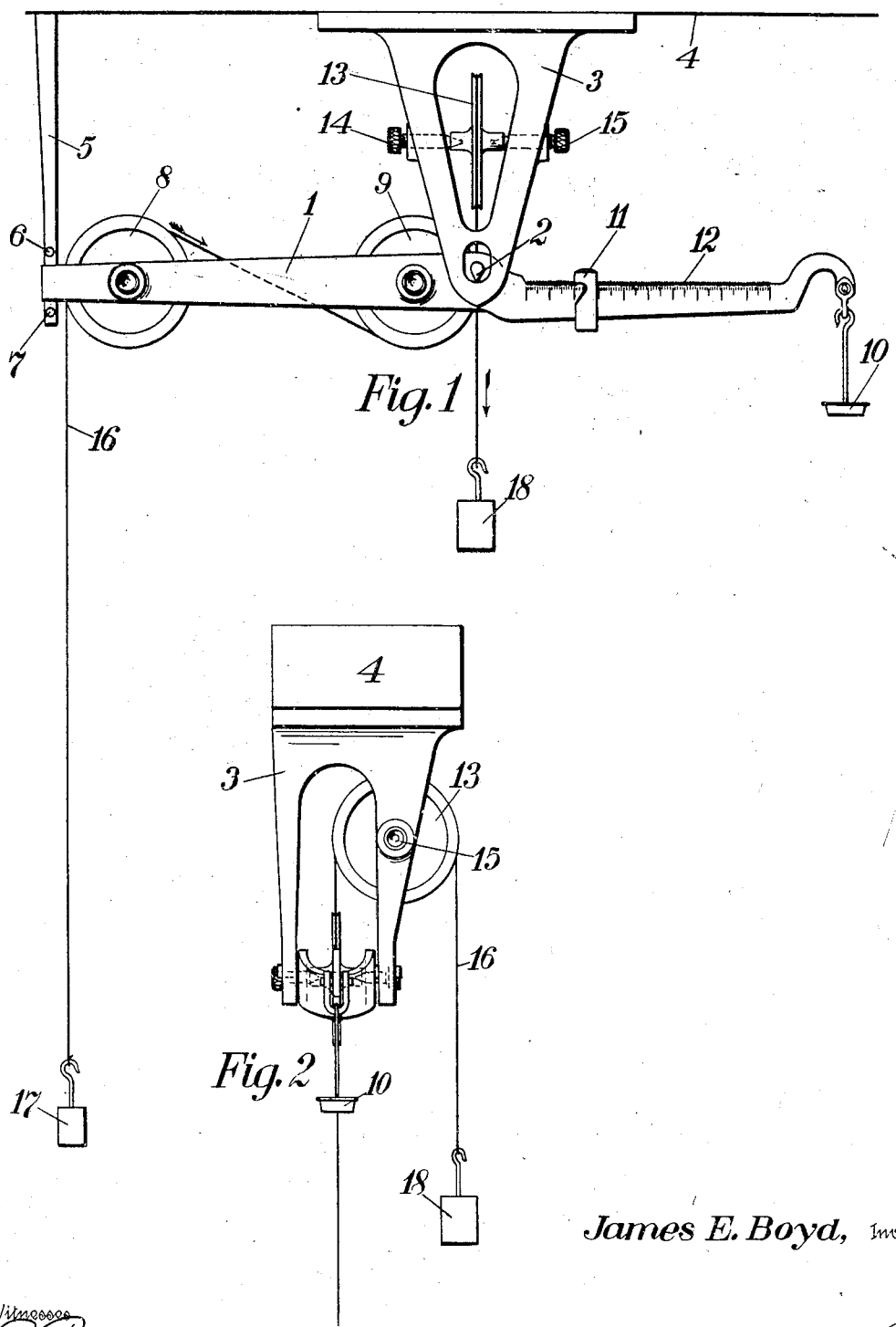

J. E. BOYD.
APPARATUS FOR MEASURING ACCELERATION.
APPLICATION FILED MAR. 9, 1908.

930,142.

Patented Aug. 3, 1909.

2 SHEETS—SHEET 1.

James E. Boyd, Inventor

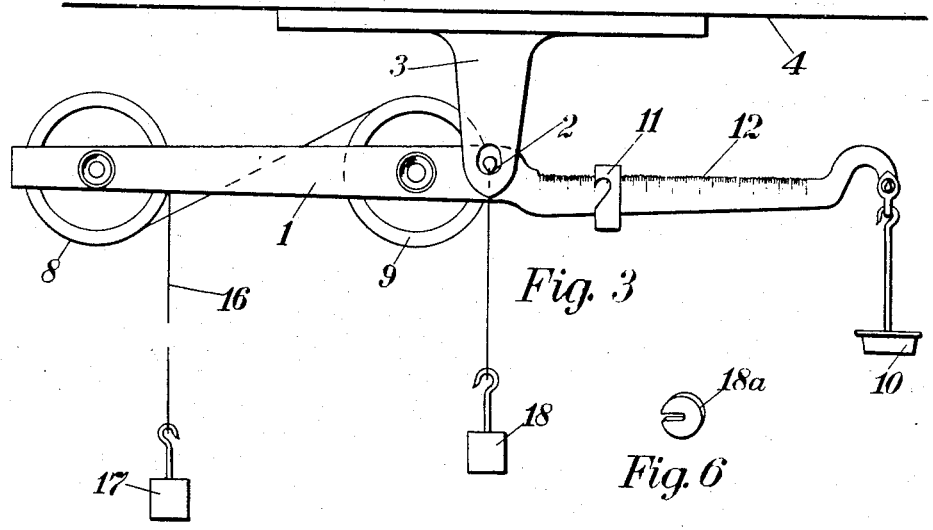
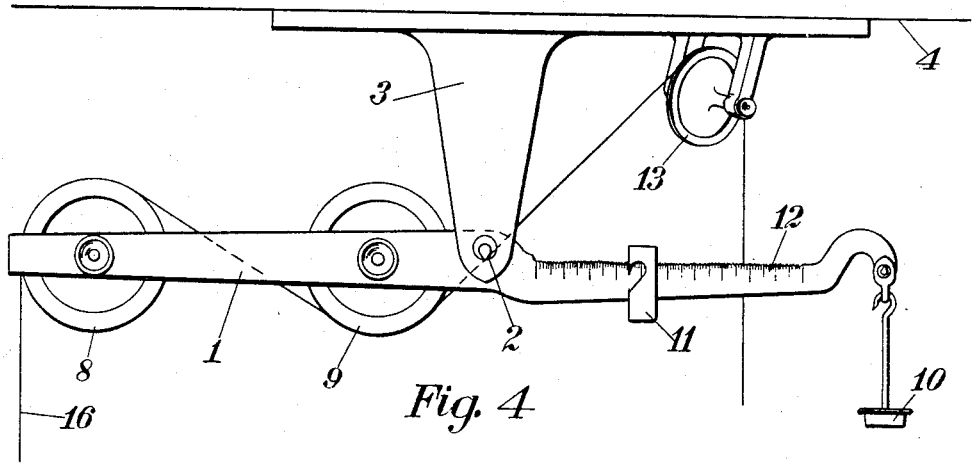
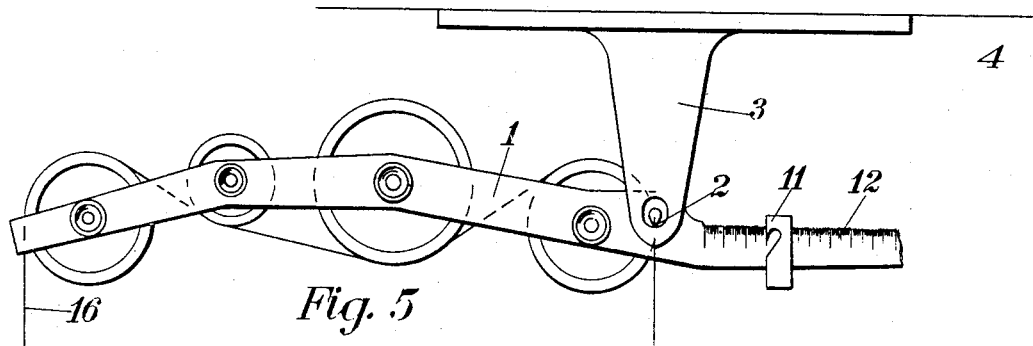

UNITED STATES PATENT OFFICE.

JAMES E. BOYD, OF COLUMBUS, OHIO.

APPARATUS FOR MEASURING ACCELERATION.

No. 930,142.  Specification of Letters Patent.  Patented Aug. 3, 1909.

Application filed March 9, 1908. Serial No. 419,920.

*To all whom it may concern:*

Be it known that I, JAMES E. BOYD, a citizen of the United States, residing at Columbus, in the county of Franklin and State of Ohio, have invented certain new and useful Improvements in Apparatus for Measuring Acceleration, of which the following is a specification.

My invention relates to an apparatus or device for measuring the force of acceleration, by the use of which device I may eliminate the inertia of the pulleys employed and also render it unnecessary to make a correction for friction; the device is an improvement on the well known Atwood machine. The Atwood machine as it has generally been employed for determining acceleration of a moving body, requires a correction for friction and also for the inertia of the pulley, and my device has for its objects the elimination of the factors of friction and inertia from the problem of determining the force of acceleration, and it consists essentially of a system in which a plurality of pulleys is employed, the system being fulcrumed on a knife edge, and containing means for establishing a balance of the parts as desired; an essential condition of the proper operation of the system is that the line of the accelerating force and the line of the knife edge lie in the same plane. This class of device finds beneficial use in class-room experiments in illustration of the second law of motion, and is also useful in practically determining the acceleration of a moving mass; it is also of use in lecture work before a number of people.

It consists of further parts and their combinations which will be hereinafter clearly set forth.

Referring to the drawings which are hereto attached and hereby made a part of this specification, Figure 1 is a side view of the system comprising a beam and pulleys and accelerating weights as noted, and Fig. 2 is an end view of the apparatus shown in Fig. 1. Figs. 3, 4, and 5 are modifications; Fig. 6 is the accelerating weight.

In the drawings in which the same numeral indicates the same part throughout, 1 is a frame or beam supported on the knife edge fulcrum 2, said fulcrum being mounted in a bracket member 3 appropriately secured to a ceiling or other elevated surface 4; the beam 1 at one end is positioned in an opening in the bracket 5 having the stops 6 and 7 therein for the purpose of preventing the beam from swinging upwardly or downwordly beyond a moderate limit. Mounted on this beam to turn freely are the pulleys 8 and 9; the beam on one side of the knife edge fulcrum is graduated, and contains the removable hook weight 10 and the poise 11, the weight 10 being so constructed that additional weights may be placed thereon in a well known manner if desired for the purpose of producing a balance in the beam; when the parts are in balance, if a force is set in operation which tends to destroy the balance, the poise 11 may be moved along the graduated scale 12 until the balance is restored. It is apparent that the force which produces the change of equilibrium in the beam may be weighed or determined by the distance through which the poise 11 is required to be moved in order to restore the equilibrium. In the apparatus as illustrated in the drawings, a third pulley 13 is provided, which is mounted on the beveled inner ends of the set screws 14 and 15, to turn freely thereon.

A cord or traction member 16 is passed over the pulley 8 and under the pulley 9, and is led upwardly therefrom over the pulley 13 in the plane of the knife edge fulcrum, from which latter pulley it is shown as depending; a weight 17 is suspended from the cord 16 as shown, and a second weight 18 is suspended from the opposite end of the cord 16. In the operation of the device, the weights 17 and 18 are equal, and when they have been positioned on the cord, the system, comprising weights, pulleys and beam is balanced by placing weights as desired at 10 and moving the poise 11 as necessary, until the system is in perfect balance; then an additional weight 18$^a$ is placed on the weight 18, as a result of which said weight 18 will accelerate downwardly and the weight 17 will accelerate upwardly. Inasmuch as the portion of the cord 16 connecting the pulleys 9 and 13 passes through the line of the knife edge, the latter being the center of moments of the moving parts, the weight 18 has no direct effect upon the equilibrium of the beam. However, there is an indirect effect produced upon the balance of the frame, inasmuch as the weight 17 is accelerated upwardly, and the force on the cord is equivalent to the weight 17 and the force required to accelerate it, the effect of which is to unbalance the system;

to restore the balance the poise 11 is moved as required, the amount of movement thereof measuring the force which is required to accelerate the weight 17. Now if the value of a division of the scale 12 is known in terms of the weight on that portion of the cord 16 depending from pulley 8, the extent of the movement of the poise necessary to produce the equilibrium measures the accelerating force on weight 17. If only a single pulley be used in such apparatus for measuring the accelerating force on a mass 17, the moment required to balance the beam 1 must be corrected by an amount equal to the moment of the couple required to accelerate the pulley. If two pulleys are used rotating in the same direction, a similar correction must be made; with the pulleys rotating in opposite directions, if said pulleys are exactly equal, or if the quotient obtained by dividing the moment of inertia of the pulley by the radius measured to the center of the cord is the same for both pulleys, there will be no correction whatever required. The friction has no effect upon the equilibrium of the beam since the friction is an internal force with respect to the beam and pulley treated together as a closed system. If such a system is constructed with a single pulley, such as pulley 9 of Fig. 1, the moment of the forces from the frame to the pulley which go to accelerate said pulley are equal, (since the system is closed) to the moments of the forces from the pulley to the frame, action and reaction being always equal. Now, in my apparatus, by the use of two equal pulleys which rotate in opposite directions, the couple exerted upon the beam or frame 1 is zero, the couple which accelerates one pulley in one direction being equal and opposite to the couple which accelerates the second pulley in the opposite direction. It is not necessary that these two pulleys be exactly of the same diameter and mass so long as they fulfil the condition that the quotient obtained by dividing the moment of inertia by the radius measured from the center of the axis to the center of the cord, shall be the same for both. For, representing the moment of inertia by the character $I$, the moment of the couple required to accelerate a given pulley is $I$ multiplied by the angular acceleration of said pulley. If $a$ represents the linear acceleration of the cord and $r$ the radius of the pulley, the angular acceleration is equal to the linear acceleration divided by the radius, that is, $a$ divided by $r$; accordingly the moment of the couple accelerating the pulley is equal to the moment of inertia divided by the radius and multiplied by the linear acceleration $a$, or is equal to $a$ multiplied by the quantity $I$ divided by $r$. Further, more than two pulleys may be used, but one or more thereof must be made to rotate in one direction, and the others in the opposite direction; in other words, the pulleys must be arranged in oppositely rotating sets, and these sets must bear such relation to each other that the sum of the quotients obtained by dividing the respective moments of inertia of the pulleys of one set by their respective radii measured to the center of the traction member thereon, shall be equal to the quotients similarly obtained for the other set.

Pulley 13 is not essential to the working of the system, as the cord may pass completely around pulley 8 and be brought up over pulley 9 and downwardly through the line of the knife edge fulcrum 2 as appears in Fig. 3; it will be seen that this method of disposing the cord upon the pulleys produces rotation in the pulleys in opposite directions and thereby accomplishes the same effect as is produced by the construction shown in Fig. 1.

Although I have illustrated pulley 13 as being directly above the knife edge and have shown the cord 16 led vertically upward through the line of the knife edge over the pulley 13, yet such arrangement of the pulley 13 is not essential; for instance, the pulley 13 might be located out of the vertical line through the knife edge and at some distance from the beam at one side or the other thereof as appears in Fig. 4, it being essential only that the line of the cord when leaving the pulley 9 intersect the line of the knife edge.

I do not limit myself to the above forms whereby a single continuous cord is used. The weight 17 may be attached to a traction member wound around the pulley as a drum as shown in Fig. 3, and the motion may be imparted to either pulley by a second cord or belt, or by a friction wheel, and may be transmitted from one pulley to another by any one of the well known means such as a belt or friction wheel; or the cord may be continuous over a single pulley and a second pulley or group of pulleys be supported by the frame and so arranged as to rotate in a direction opposite to that of the first mentioned pulley aforesaid as appears in Fig. 5, the necessary condition being that this second pulley or group of pulleys shall bear such relation to the first pulley or group or set of pulleys that the sum of the products obtained by multiplying the moment of inertia of each pulley of the second group of pulleys by its angular velocity shall be the same as the product of the moment of inertia by the angular velocity of the first pulley or set of pulleys.

It will be understood throughout that the terms set and group referring to the pulleys may include one or more pulleys, those rotating in the same direction in any given case, constituting a set or group.

I do not limit myself to the specific arrangement of parts and features of construction shown and described herein, but desire to have the advantage of any changes or modifications within the scope of the appended claims.

What I claim is:

1. A frame pivotally balanced, a plurality of pulleys arranged in sets equal as to dimensions and density mounted in said frame, a traction member disposed on said pulleys in such manner as to cause said sets to rotate in opposite directions, one of said pulleys being so positioned that the line of said traction member leaving said pulley intersects the line of the pivot of said frame, a weight supported on said traction member from one of said pulleys, means for accelerating said pulleys, means for balancing said frame and measuring the moments of the forces exerted upon the frame.

2. A frame pivotally balanced, a plurality of pulleys mounted in sets on said frame, a traction member positioned upon said pulleys to cause said sets to rotate in opposite directions, said pulleys being of such dimensions that the quotients obtained by dividing the respective moments of inertia of each set by their respective radii measured from the center of each pulley to the center of the traction member thereon shall be equal, one of said pulleys being so positioned that the line of said traction member leaving said pulley intersects the line of the pivot of said frame, a weight supported on said traction member from one of said pulleys, means for accelerating said pulleys, means for balancing said frame and measuring the moments of the forces exerted upon the frame.

3. A frame pivotally balanced, a plurality of pulleys supported by said frame, a traction member engaging said pulleys whereby a portion of said pulleys is rotated in one direction and the remainder in the opposite direction, the dimensions of said pulleys being such that the sum of the quotient obtained by dividing the moment of inertia of each pulley in each set by its radius measured from its center to the center of the traction member shall be the same for the sets of pulleys, one of said pulleys being so positioned that the line of said traction member leaving said pulley intersects the line of the pivot of said frame, a weight supported on said traction member from one of said pulleys, means for accelerating said pulleys, means for balancing said frame and measuring the moments of the forces exerted upon said frame.

4. A frame pivotally balanced, a plurality of pulleys supported on said frame, a traction member engaging said pulleys whereby one set of said pulleys is rotated in one direction and the remainder in the opposite direction, the dimensions of said pulleys being such that the sum of the quotient obtained by dividing the moment of inertia of each pulley in each set by its radius measured from its center to the center of the traction member shall be the same for the sets of pulleys, a pulley mounted independently of said frame, said traction member being adapted to be led from one of the first mentioned pulleys through the line of said knife edge over said last mentioned pulley, a weight supported on said traction member from one of said first mentioned pulleys, means for accelerating said pulleys, means for balancing said frame and for measuring the moments of the forces upon said frame.

5. A device for measuring the force of acceleration comprising a beam pivotally supported, a plurality of pulleys mounted on said beam and arranged in two sets whereby the pulleys in one set may be rotated in one direction and those of the other set in the opposite direction, the dimensions of said pulleys being such that the sum of the products obtained by multiplying the moment of inertia of each pulley by its angular velocity is the same in each set, means for exerting a driving force upon said pulleys in a line intersecting the pivot supporting said beam, a weight-bearing traction member arranged to be accelerated by said pulleys and disposed thereon at a point somewhat remote from said pivot whereby the force exerted on said traction member has considerable moment with respect to said pivot.

In testimony whereof I affix my signature in the presence of two witnesses.

JAMES E. BOYD.

Witnesses:
GEO. W. RIGHTMIRE,
A. RAGER.